Figure 1:
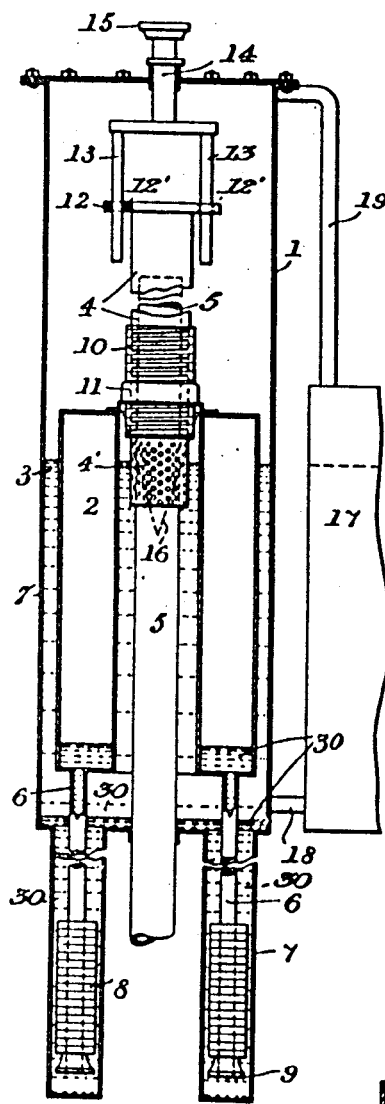

R. P. DOUDNEY.
CARBURETING APPARATUS.
APPLICATION FILED NOV. 5, 1912.

1,055,891.

Patented Mar. 11, 1913.

2 SHEETS—SHEET 1.

Witnesses
Mary G. Brooks.
Harry King.

Inventor
Raymond Belly Doudney
By
Attorney

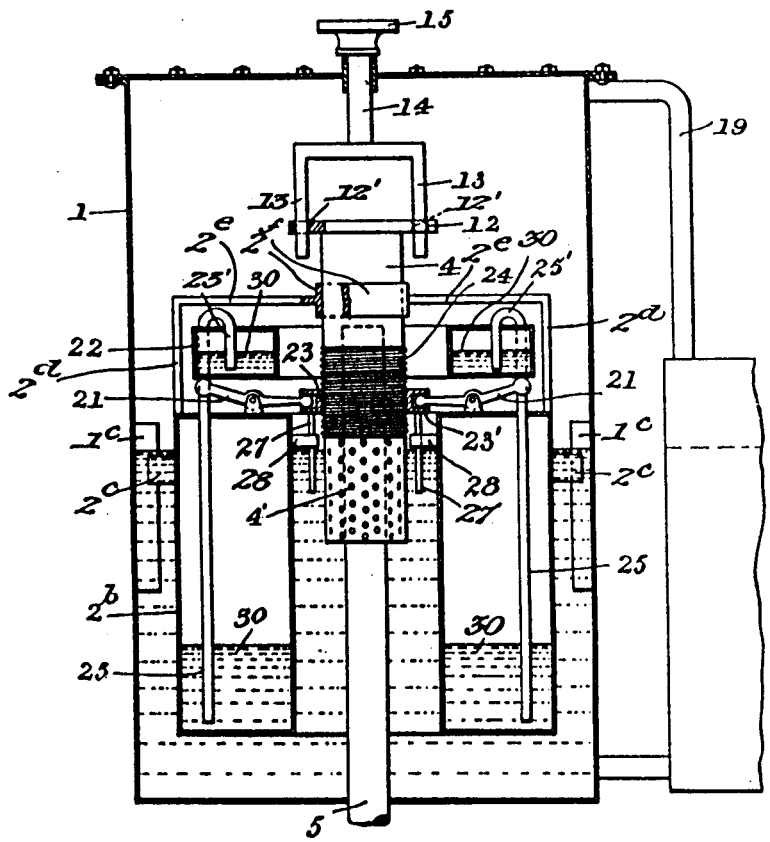

UNITED STATES PATENT OFFICE.

RAYMOND PELLY DOUDNEY, OF BATTICALOA, CEYLON.

CARBURETING APPARATUS.

1,055,891.   Specification of Letters Patent.   Patented Mar. 11, 1913.

Application filed November 5, 1912. Serial No. 729,591.

*To all whom it may concern:*

Be it known that I, RAYMOND PELLY DOUDNEY, a subject of the King of Great Britain, and residing at Batticaloa, Ceylon, formerly of Clarendon Villa, Wantage, Berkshire, England, have invented certain new and useful Improvements in and Relating to Carbureting Apparatus, of which the following is a specification.

My invention relates to improvements in carbureting apparatus such as for the production of air gas.

In a great many carbureters free floats have been proposed to follow or to control the level of the hydrocarbon liquid in the carbureting chamber. It is well-known that following the temperature of the surrounding atmosphere, the temperature of the carbureter and the hydrocarbon liquid it contains is raised or lowered and that according to the temperature the vaporizing qualities of the hydrocarbon liquid are increased or decreased. Owing to the sudden changes in climate, it has hitherto been impossible to adjust a carbureting apparatus to produce the desired mixture over any long period of time. Further a low temperature is caused in the carbureter by the vaporization of the hydrocarbon, and it is found in practice that if the production of mixture is increased in the carbureting chamber the vaporizing qualities of the hydrocarbon liquid are correspondingly decreased owing to the decreasing temperature within the carbureter.

The present invention consists in utilizing the expansion and contraction of the air in a chamber preferably a float chamber to adjust automatically the vaporizing apparatus according to the temperature in the carbureting chamber and that of the surrounding atmosphere. The floats hitherto used in carbureters have been closed air chambers with walls incapable of expansion or contraction and consequently the temperature of, and in, the carbureting chamber has not affected the position of the float with regard to the level of the hydrocarbon liquid in the chamber.

Preferably I employ a free float chamber or series of float chambers forming a float in which the contraction or expansion of the air in the float, which is caused by the decrease or increase of the temperature of or in the carbureting chamber, results in the cubic space in the float chamber, occupied by the air, contracting or expanding and consequently in the position of the float varying with regard to the level of the hydrocarbon liquid in the chamber according to the temperature.

It will be obvious that my invention may be applied in a variety of ways to different forms of carbureters.

My invention is illustrated by way of example in the accompanying drawings in which:—

Figure 2:
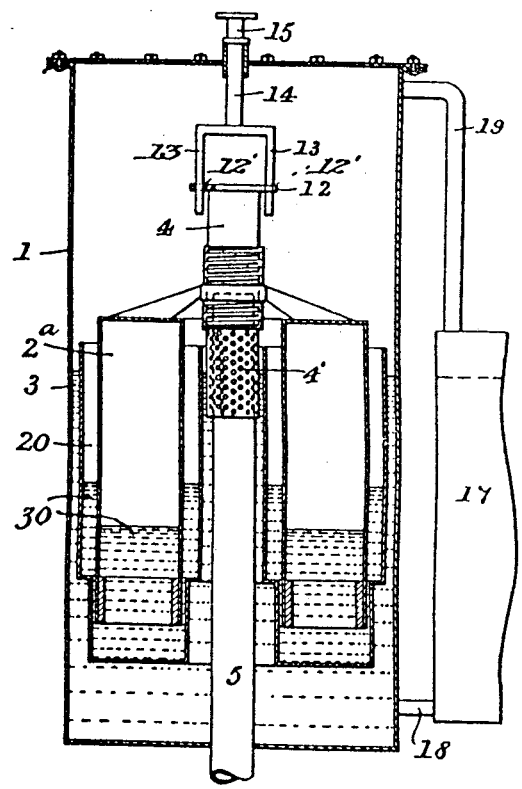
Figure 4:
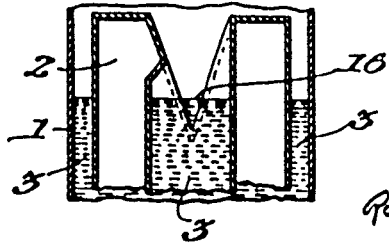

Figure 1 is an elevation mostly in vertical section of a carbureter of the class in which the free float follows the level of the hydrocarbon liquid and carries a vertical pipe, capable of being partially or wholly submerged and having air inlet openings at different heights, through which the air to be carbureted is taken, and Figs. 2 and 3 are elevations mostly in vertical section showing alternative forms of this class of carbureter. Fig. 4 represents a vertical section of the upper portion of the annular float chamber, omitting the air pipe and its support and showing the circulation notches or passages in the upper part thereof.

Referring now to Fig. 1 of the drawings, 1 indicates the carbureter tank, 2 indicates the annular or otherwise shaped float chamber which follows the level of the carbureting liquid 3 and carries a vertical pipe 4 with a closed upper end to which air is supplied by the pipe 5. The lower end of the vertical pipe 4 is provided with a series of perforations 4' or other form of openings which constitute air inlets for admitting air to the carbureting chamber. These air inlets 4' are arranged at different heights in the pipe and are adapted to be submerged or partially submerged in the hydrocarbon liquid 3 and through which the air passes through or over the hydrocarbon liquid.

The vertical pipe 4 is provided through a portion of its length with an exterior screw-thread 10 which engages the collar 11 carried by the float chamber 2. The perforations at the lower end of said pipe 4 can be partially or wholly submerged in the hydrocarbon liquid 3 by turning said pipe 4 in the collar 11. The cross-bar 12 arranged at the upper end of said pipe 4 is engaged by the rods 13 carried by the vertical rod 14 which projects through the top of the carbureting tank 1 and carries at its upper end the head 15.

The float chamber 2 is provided with open pipe members 6 projecting downwardly through the hydrocarbon liquid into corresponding vessels 7 projecting from the bottom of the carbureter tank 1 and containing water, mercury or any other non-volatile or suitable liquid. As shown I prefer to weight the lower ends of the pipe members, 6, conveniently by means of a series of washers 8, retained in position by the nuts 9 screwed over the lower ends of the members 6. By this arrangement the weight can easily be adjusted as desired.

In practice the vessels 7 projecting from the bottom of the carbureter tank 1 will be first filled with the non-volatile or other suitable liquid and the float chamber is then placed in the carbureter tank with the downwardly projecting pipe members 6 resting in said vessels and finally the tank filled to the desired level with the hydrocarbon liquid.

It will be readily understood that following the expansion or contraction of the air in the float chamber the level of the non-volatile liquid in the float will change and consequently the position of the float 2 in regard to the level of the hydrocarbon liquid in the tank will vary so that more or fewer of the openings 4' are submerged depending on the temperature in said tank and more or less of the incoming air will pass through the carbureting liquid.

In order that there may be a free convection or circulation of the hydrocarbon liquid down the center and around the outer wall of the annular float chamber 2 I prefer to arrange two or more passages 16, preferably V-shaped, in the upper end of said float chamber, as shown in dotted lines, through which the hydrocarbon liquid can pass freely from around the outer wall of the float chamber near the top thereof down through the center of said chamber.

If the body of the float were continued of the same cross sectional area down into the heavier liquid used for sealing, it is obvious that its buoyancy would increase as the level of hydrocarbon fell, and cause an alteration in the level of the perforations relative to the surface of the hydrocarbon, but this is compensated for by the fact that the legs 6 have a cross-sectional area less than the main part of the float and thus the increase in head of heavy liquid in the float, which head may be arranged to be above the level of the top of the legs, has the effect of loading the float somewhat, because a part of the increased head does not lie vertically over the legs and is consequently so much added weight to the float. The cross-sectional areas of the legs may be so arranged relatively to the cross-sectional area of the body of the float as to insure that the perforations keep their position relatively to the hydrocarbon surface throughout the fall of the hydrocarbon between pre-arranged limits, providing the temperature remains constant, or may be arranged to insure any desired relative movement. If the cross-sectional area of the legs relatively to the float is too small, the effect will be to cause over loading of the float and make the perforations sink relatively to the hydrocarbon surface.

In connection with the above described carbureter I may provide, in a convenient position, a hydrocarbon liquid reservoir tank 17, communicating with the carbureting tank 1 by means of a supply pipe 18 with an inlet suitably placed near the bottom of the tank 1 and by a return pipe 19 by which the air pressure in the said reservoir tank 17 and said carbureter tank 1 is equalized. The top of the reservoir tank 17 is arranged just below the top of the air inlet pipe 5 of the carbureter. It will be obvious that with this arrangement the level of the float will normally follow and correspond with the level of the hydrocarbon liquid in the tank 17.

In Fig. 2 I show an alternative form of my invention. The annular float chamber 2 is open at the bottom and floats on the non-volatile liquid contained in the open annular chamber 20 which in turn floats in the hydrocarbon liquid 3 in the carbureter tank 1.

The operation of this carbureter is as follows:—The annular vessel 20 being open at the top it is not affected by changes of temperature in the carbureter tank 1, but the float chamber 2 being closed at the top and liquid sealed at the bottom rises or falls as the temperature changes in said tank, thus raising or lowering the vertical pipe 4 in regard to the level of the hydrocarbon liquid in the tank 1 according to the temperature in said tank.

In Fig. 3 I show another alternative form of my invention. In this form the float chamber $2^b$ is closed and contains in its lower part a non-volatile liquid 30 and a number of levers 21 are pivoted on suitable supports at its top. The air inlet pipe 4 is carried by the float chamber but is not in fixed relation thereto. This pipe is provided as in the other figures with perforations 4' and with an exterior screwthread. A threaded collar 23 engages said threaded pipe 4. This collar is provided with dependent guide rods 27 which slide in guide ears 28 secured to the inner wall of the tank $2^b$. This collar 23 is provided with radial sockets 23' or equivalent means which are engaged by the inner ends of the levers 21. A smaller annular open tank 22 also containing a non-volatile liquid 30 is supported on the outer ends of the levers 21. A pipe 25 connects the tank $2^b$ with the tank 22 above it. This pipe opens at its lower end into the tank $2^b$ through the liquid seal 30 therein and is provided at its upper end with an inverted U-shaped bend 25' which depends into the liquid seal 30 in the tank 22. The tank 1 is provided in this instance with guideways 1° on opposite sides which are engaged by guides 2° on the float chamber 2ᵇ. In this construction the float chamber 2ᵇ has a bracket composed of two uprights 2ᵈ and a horizontal bar 2ᵉ. A guide ring 2ᶠ is supported by said bar centrally above said float chamber 2ᵇ and serves as a guide in which the tube 4 plays as said chamber rises and falls.

It will be obvious that with the expansion or contraction of the air in the float chamber 2ᵇ more or less liquid will pass from the float chamber to the chamber 22 and vice versa and consequently the weight of said chamber 22 will vary, thereby varying through the levers 21 the height of the pipe 4 with regard to the level of the hydrocarbon liquid in the carbureting tank.

Having fully described my invention what I claim and desire to secure by Letters Patent is:—

1. In a carbureter, the combination of a carbureting chamber containing a volatile hydrocarbon, a float chamber floating in said carbureting chamber, an air inlet pipe carried by said float chamber and provided with inlet openings at different heights adjacent to the normal level of said volatile liquid, means for supplying air to said inlet pipe, and automatic means controlled by the temperature of the float chamber for shifting the vertical position of said pipe to submerge or expose more or fewer of said openings and increase or decrease the inflow of air through the volatile hydrocarbon.

2. In a carbureter, a chamber which floats in hydrocarbon liquid, an open pipe member projecting downwardly from the bottom of the float chamber the latter being otherwise closed, a suitable sealing liquid into which said pipe member dips and upon which the hydrocarbon is adapted to float, a source of supply of air to be carbureted, and a pipe for carrying such air having its delivery opening controlled by the movements of the said float chamber.

3. In a carbureter, a float chamber, which follows the level of the hydrocarbon liquid, an open pipe member projecting downwardly from the bottom of the float chamber the latter being otherwise closed, a suitable sealing liquid into which said pipe member dips and upon which the hydrocarbon floats, and the said float chamber being weighted to cause the sealing liquid to rise above the level of the top of the pipe member and by causing pre-arranged loading of the float, to control the rate at which the float falls relatively to the surface of the hydrocarbon liquid.

4. In a carbureter having a float chamber which follows the level of the hydrocarbon liquid in a containing vessel, a float chamber open only at its lower end, a suitable sealing liquid into which said float chamber dips, and an air supply pipe passing up through the bottom of the containing vessel and communicating and telescoping with an upper pipe which is closed at its upper end and has an outlet or outlets at its lower end, said upper pipe carried by the float and moving therewith relatively to the surface of the liquid hydrocarbon in accordance with changes in temperature of the carbureter.

5. In a carbureter, the combination of a carbureting chamber containing a non-volatile liquid in its lower part adapted to serve as a liquid seal, a volatile liquid on said sealing liquid and a gas space above said volatile liquid, a float chamber disposed within said carbureting chamber and floating in the liquid contained therein, the interior of said float chamber being in communication with the interior of said carbureting chamber through said sealing liquid, the top of said liquid within said float chamber constituting a surface against which gas contained therein presses, said surface being capable of yielding under variations of the pressure due to change of temperature and thereby varying the gas containing capacity of said float chamber, and means whereby the variation of the gas containing capacity of the float chamber controls the relative proportion of hydrocarbon and air in the combustible mixture produced in said carbureting chamber.

6. In a carbureter, the combination of a carbureting chamber containing a non-volatile liquid in its lower part adapted to serve as a liquid seal, a volatile liquid on said sealing liquid, and a gas space above said volatile liquid, a float chamber disposed within said carbureting chamber and floating in the liquid contained therein, the interior of said float chamber being in communication with the interior of said carbureting chamber through said sealing liquid, the top of said liquid within said float chamber constituting a surface against which gas contained therein presses, said surface being capable of yielding under variations of the pressure due to change of temperature and thereby varying the gas containing capacity of said float chamber, an air inlet pipe carried by said float chamber and provided with openings at different heights adjacent to the normal level of said volatile liquid and means for supplying air to said inlet pipe.

7. In a carbureter, the combination of a carbureting chamber containing a non-volatile liquid in its lower part adapted to serve as a liquid seal, a volatile liquid on said sealing liquid and a gas space above said volatile liquid, a float chamber disposed within said carbureting chamber and floating in the liquid contained therein, the interior of said float chamber being in communication with the interior of said carbureting chamber through said sealing liquid, the top of said liquid within said float chamber constituting a surface against which gas contained therein presses, said surface being capable of yielding under variations of the pressure due to change of temperature and thereby varying the gas containing capacity of said float chamber, an adjustable air pipe carried by said float chamber and provided with openings at different heights adjacent to the normal level of said volatile liquid, and means for supplying air to said pipe.

8. In a carbureter, the combination of a carbureting chamber containing a non-volatile liquid in its lower part adapted to serve as a liquid seal, a volatile liquid on said sealing liquid and a gas space above said volatile liquid, a float chamber disposed within said carbureting chamber and floating in the liquid contained therein, the interior of said float chamber being in communication with the interior of said carbureting chamber through said sealing liquid, the top of said liquid within said float chamber constituting a surface against which gas contained therein presses, said surface being capable of yielding under variations of pressure due to change of temperature and thereby varying the gas containing capacity of said float chamber, an air inlet pipe carried by said float chamber and provided with openings at different heights adjacent to the normal level of said volatile liquid, and a stationary air supply pipe extending into the movable air inlet pipe connected with said float chamber and having its orifice above the level of the volatile liquid in said carbureting chamber.

In witness whereof I have hereunto signed my name this 7th day of October 1912, in the presence of two subscribing witnesses.

RAYMOND PELLY DOUDNEY.

Witnesses:
  SAMUEL J. C. KADIS SAMAR,
  RATNAWURA P. JOHN SVIGHO.

---

Copies of this patent may be obtained for five cents each, by addressing the "Commissioner of Patents, Washington, D. C."